(12) United States Patent
Huang

(10) Patent No.: US 9,104,095 B2
(45) Date of Patent: *Aug. 11, 2015

(54) STEREOSCOPIC DISPLAY ILLUMINATOR AND STEREOSCOPIC DISPLAY DEVICE

(71) Applicant: DELTA ELECTRONICS, INC., Taoyuan Hsien (TW)

(72) Inventor: June-Jei Huang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 171 days.

This patent is subject to a terminal disclaimer.

(21) Appl. No.: 13/940,823

(22) Filed: Jul. 12, 2013

(65) Prior Publication Data

US 2014/0293170 A1 Oct. 2, 2014

(30) Foreign Application Priority Data

Mar. 27, 2013 (TW) .............................. 102110796 A

(51) Int. Cl.
| | |
|---|---|
| G03B 21/00 | (2006.01) |
| G03B 21/28 | (2006.01) |
| G02B 27/22 | (2006.01) |
| G02B 27/14 | (2006.01) |

(52) U.S. Cl.
CPC .............. G03B 21/28 (2013.01); G02B 27/141 (2013.01); G02B 27/149 (2013.01); G02B 27/2207 (2013.01); G02B 27/2242 (2013.01)

(58) Field of Classification Search
CPC ........ G03B 21/10; G03B 21/14; G03B 21/28; H04N 9/3141; H04N 9/3197
USPC ............ 353/7, 31, 33, 37, 84, 85, 94, 98, 99, 353/102; 362/84, 297, 298, 302, 304; 348/743–747, 771
See application file for complete search history.

(56) References Cited

U.S. PATENT DOCUMENTS

| | | | |
|---|---|---|---|
| 6,905,212 B2 * | 6/2005 | Pate et al. .................... | 353/31 |
| 7,540,616 B2 * | 6/2009 | Conner ........................ | 353/20 |
| 8,500,290 B2 * | 8/2013 | Geissler et al. ............... | 353/99 |
| 2003/0184718 A1 * | 10/2003 | Childers et al. .............. | 353/122 |
| 2006/0192902 A1 * | 8/2006 | Sawai et al. .................... | 349/5 |
| 2007/0127121 A1 | 6/2007 | Maximus et al. | |
| 2010/0208342 A1 | 8/2010 | Olsen | |
| 2014/0092581 A1 * | 4/2014 | Berben ........................ | 362/84 |

* cited by examiner

*Primary Examiner* — Sultan Chowdhury
(74) *Attorney, Agent, or Firm* — Lowe Hauptman & Ham, LLP

(57) ABSTRACT

A stereoscopic display illuminator includes a first light source, a curved mirror, a rotational wheel, an actuator, a multi-band filter, and an optical module. The first light source is used for providing a first light beam. The rotational wheel is disposed between the first light source and the curved mirror. The first light beam is reflected and passes through the rotational wheel in sequence. The multi-band filter allows portion of the first light beam to pass through, and allows another portion to be reflected, where the wavelengths of these two portions do not overlap. The optical module disposed between the first light source and the rotational wheel is used for guiding the first light beam to the rotational wheel, and guiding the first light beam to propagate either from the first reflective segment or from the curved mirror to two opposite sides of the multi-band filter.

24 Claims, 10 Drawing Sheets

STEREOSCOPIC DISPLAY ILLUMINATOR AND STEREOSCOPIC DISPLAY DEVICE

RELATED APPLICATIONS

This application claims priority to Taiwan Application Serial Number 102110796, filed Mar. 27, 2013, which is herein incorporated by reference.

BACKGROUND

1. Technical Field

The present disclosure relates to a stereoscopic display illuminator. More particularly, the present invention relates to a stereoscopic display projection device.

2. Description of Related Art

Exploiting the binocular parallax of humans, a stereoscopic display establishes a three-dimensional image by providing two different images respectively to the two eyes of an observer. There are various methods able to providing the two different images in the general stereoscopic display technologies, including such as a polarization 3D technology, an anaglyphic 3D technology, and a wavelength multiplexing 3D technology.

The stereoscopic display device of the wavelength multiplexing technology generates a stereoscopic image by providing the images with different wavelength ranges to observers. The general color display device produces various colors in the color space by mixing the additive primary colors, i.e., red (R), green (G), and blue (B). Therefore, the stereoscopic display device of wavelength multiplexing technology can produce apart the left-eye images with a set of primary colors R1, G1, and B1, and the right-eye images with the other set of primary colors R2, G2, and B2.

The conventional stereoscopic display device of the wavelength multiplexing technology generates the left-eye light beam and the right-eye light beam by using a color wheel capable of filtering light. The wavelength ranges of the left-eye light beam and the right-eye light beam has to be precise enough and do not overlap. If the wavelength ranges of the left-eye light beam and the right-eye light beam shift, the wavelength ranges may overlap with each other and cause the crosstalk between the left-eye image and the right-eye image.

With the reducing size of the stereoscopic display device, the size of the color wheel needs to be decreased. In other words, the spot size the light beam impinging on the color wheel must be reduced, along with the extension of the incident angle of the light beam impinging on the color wheel. However, the filtering wavelength range of color wheel may shift if the incident angle of the light beam is too large, and the wavelength ranges of the left-eye light beam and the right-eye light beam may overlap on another and cause the crosstalk between the left-eye image and the right-eye image.

SUMMARY

An aspect of the present invention provides a stereoscopic display illuminator including a first light source, a curved mirror, a rotational wheel, an actuator, a multi-band filter, and an optical module. The first light source is used for providing a first light beam. The rotational wheel is disposed between the first light source and the curved mirror, and includes a first transmission segment and a first reflective segment. The actuator is used for rotating the rotational wheel, such that the first transmission segment and the first reflective segment of the rotational wheel are disposed on a path of the first light beam in sequence. The multi-band filter is used for allowing portion of the first light beam to pass through, and allowing another portion of the first light beam to be reflected, wherein the wavelengths of these two portions do not overlap. The optical module is disposed between the first light source and the rotational wheel for being used for guiding the first light beam to the rotational wheel, and respectively guiding the first light beam either propagating from the first reflective segment or propagating from the curved mirror to two opposite sides of the multi-band filter, such that the portion of the first light beam passes through the multi-band filter and reach a light emission position, and the another portion of the first light beam is reflected by the multi-band filter and reaches the light emission position.

In one or more embodiments, the stereoscopic display illuminator has an optical axis, and a position the first light beam impinging to the rotational wheel is off of the optical axis.

In one or more embodiments, the optical module can include a first prism, a second prism, a third prism, and at least one converging lens. The first prism has a first incident surface and an emission surface, wherein the first light source is disposed adjacent to the first incident surface, and the light emission position is disposed adjacent to the emission surface. The second prism defines a first gap with the first prism. The multi-band filter is disposed between the second prism and the third prism. The converging lens is disposed between the second prism and the rotational wheel.

In one or more embodiments, the optical module can include a first prism, a second prism, a reflective mirror, and at least one converging lens. The first prism has a first incident surface and an emission surface, wherein the first light source is disposed adjacent to the first incident surface, and the light emission position is disposed adjacent to the emission surface. The second prism defines a first gap with the first prism. The multi-band filter is disposed between the second prism and the reflective mirror. The converging lens is disposed between the second prism and the rotational wheel.

In one or more embodiments, an angle can be between the first light beam and a normal line of the first incident surface of the first prism.

In one or more embodiments, the first reflective segment of the rotational wheel can be disposed on the path of the first light beam by the actuator in a first time period, and the first transmission segment of the rotational wheel can be disposed on the path of the first light beam by the actuator in a second time period.

In one or more embodiments, in the first time period, the first light beam incident on the optical module is guided to the first reflective segment of the rotational wheel, reflected to the optical module by the first reflective segment, and then guided to the multi-band filter by the optical module, such that the portion of the first light beam is guided to the light emission position by the optical module after passing through the multi-band filter.

In one or more embodiments, in the second time period, the first light beam passes through the first transmission segment of the rotational wheel and reaches the curved mirror.

In one or more embodiments, in the second time period, the first light beam incident on the optical module is guided to the first transmission segment of the rotational wheel, passing through the first transmission segment, reaching the curved mirror, reflected to the optical module by the curved mirror, and then guided to the multi-band filter by the optical module, such that the another portion of the first light beam is reflected by the multi-band filter, and is guided to the light emission position by the optical module.

In one or more embodiments, the stereoscopic display illuminator further includes a second light source for providing a second light beam. The rotational wheel further includes a second transmission segment and a second reflective segment. The actuator is further used for rotating the rotational wheel, such that the second transmission segment and the second reflective segment of the rotational wheel are disposed on a path of the second light beam in sequence. The multi-band filter is further used for allowing a portion of the second light beam to pass through, and allowing another portion of the second light beam to be reflected, wherein the wavelengths of these two portions do not overlap. The optical module is further disposed between the second light source and the rotational wheel for further being used for guiding the second light beam to the rotational wheel, and respectively guiding the second light beam propagating from the second reflective segment and the second light beam propagating from the curved mirror to the two opposite sides of the multi-band filter, such that the portion of the second light beam passes through the multi-band filter and reaches the light emission position, and the another portion of the second light beam is reflected by the multi-band filter and reaches the light emission position.

In one or more embodiments, the stereoscopic display illuminator has an optical axis, and a position the first light beam impinging to the rotational wheel is off of the optical axis to one side, and a position the second light beam impinging to the rotational wheel is off of the optical axis to the a side opposite to the side.

In one or more embodiments, the optical module can include a first prism, a second prism, a third prism, and at least one converging lens. The first prism has a first incident surface and an emission surface, wherein the first light source is disposed adjacent to the first incident surface, and the light emission position is disposed adjacent to the emission surface. The second prism defines a first gap with the first prism. The multi-band filter is disposed between the second prism and the third prism. The fourth prism defines a second gap with the third prism, wherein the fourth prism has a second incident surface, and the second light source is disposed adjacent to the second incident surface. The converging lens is disposed between the second prism and the rotational wheel.

In one or more embodiments, a first angle can be between the first light beam and a normal line of the first incident surface, and a second angle can be between the second light beam and a normal line of the second incident surface.

In one or more embodiments, the first transmission segment is disposed next to the second reflective segment along a radial direction of the rotational wheel, and the first reflective segment is disposed next to the second transmission segment along the radial direction of the rotational wheel.

In one or more embodiments, the stereoscopic display illuminator has an optical axis, and the first transmission segment and the first reflective segment are disposed on the optical axis in sequence.

In one or more embodiments, the second transmission segment of the rotational wheel is disposed on the path of the second light beam by the actuator in the first time period, and the second reflective segment of the rotational wheel is disposed on the path of the second light beam by the actuator in the second time period.

In one or more embodiments, in the first time period, the second light beam passes through the second transmission segment of the rotational wheel and reaches the curved mirror.

In one or more embodiments, in the first time period, the second light beam incident on the optical module is guided to the second transmission segment of the rotational wheel, passing through the second transmission segment, reaching the curved mirror, reflected to the optical module by the curved mirror, and then guided to the multi-band filter by the optical module, such that the portion of the second light beam is guided to the light emission position after passing through the multi-band filter.

In one or more embodiments, in the second time period, the second light beam incident on the optical module is guided to the second reflective segment of the rotational wheel, reflected to the optical module by the second reflective segment, and then guided to the multi-band filter by the optical module, such that the another portion of the second light beam is reflected by the multi-band filter, and is guided to the light emission position by the optical module.

In one or more embodiments, the stereoscopic display illuminator further includes a copy lens disposed between the rotational wheel and the curved mirror.

In one or more embodiments, the curved mirror can be a spherical mirror.

In one or more embodiments, the stereoscopic display illuminator further includes a color wheel disposed at the light emission position, wherein the color wheel is used for filtering a portion of light beams reaching the light emission position.

Another aspect of the present invention provides a stereoscopic display device including the aforementioned stereoscopic display illuminator and a light modulating mechanism. The light modulating mechanism includes at least one dichroic mirror, a plurality of liquid crystal panels, and a light combining prism. The dichroic mirror is disposed at the light emission position, wherein the dichroic mirror is used for splitting the portion of the first light beam and the another portion of the first light beam to a plurality of primary-color light beams. The liquid crystal panels are used for forming the primary-color light beams to a plurality of image light beams. The light combining prism is used for collecting the image light beams and project to a lens.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
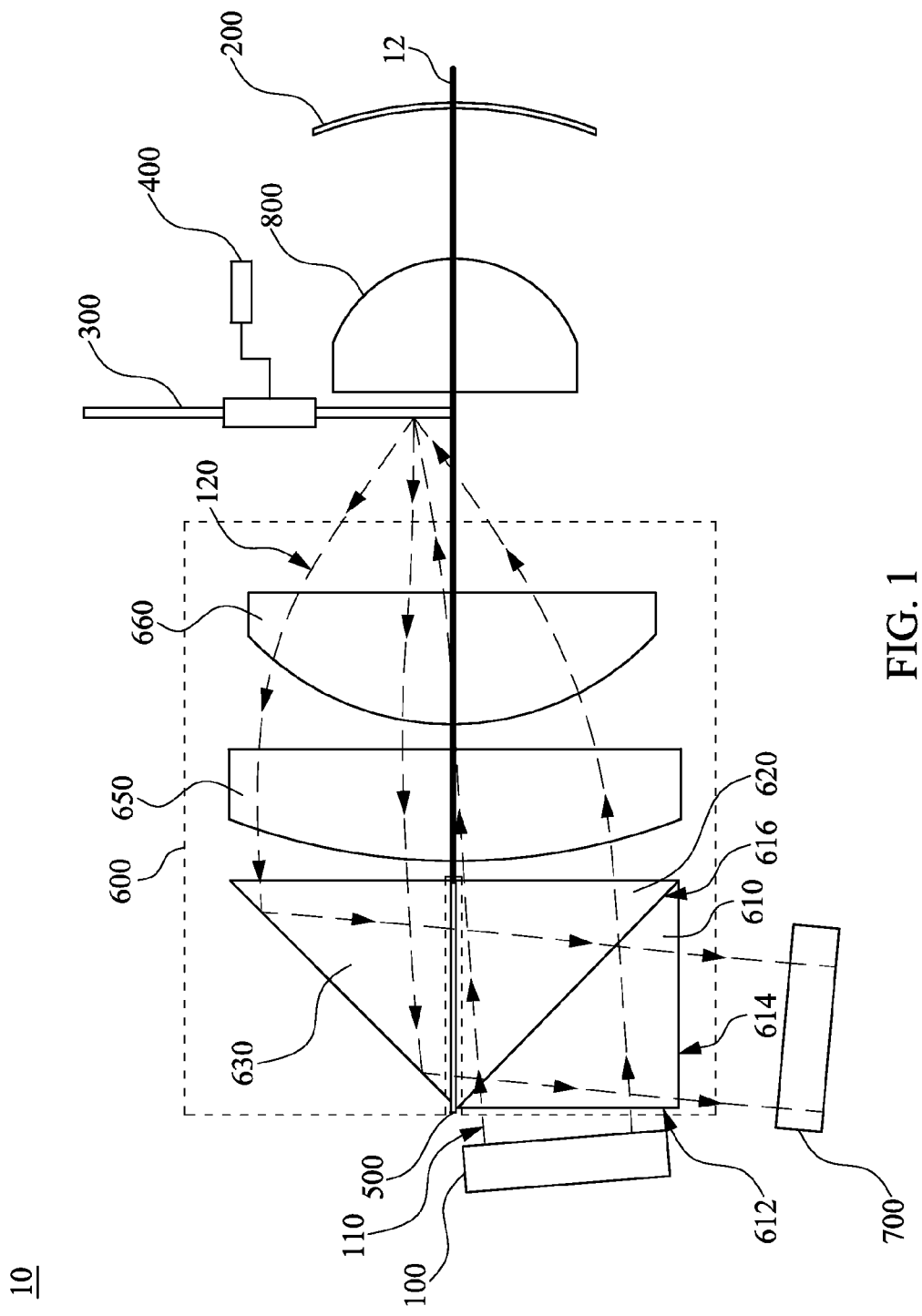
FIG. 1 is a schematic diagram of a stereoscopic display illuminator in a first time period according to one embodiment of the present invention.
Figure 2:
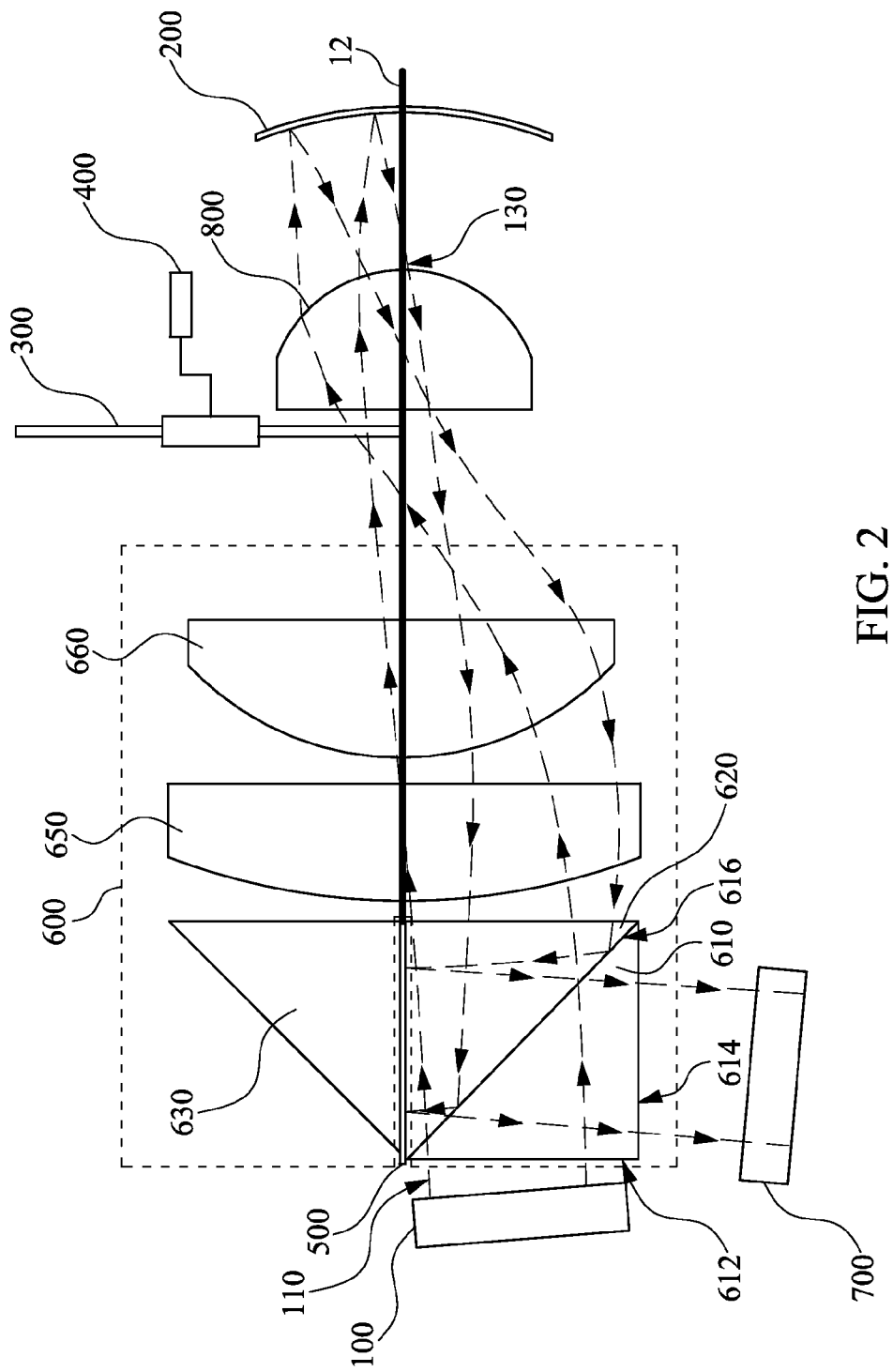
FIG. 2 is a schematic diagram of the stereoscopic display illuminator of FIG. 1 in a second time period.

FIG. 1 is a schematic diagram of a stereoscopic display illuminator 10 in a first time period according to one embodiment of the present invention, and FIG. 2 is a schematic diagram of the stereoscopic display illuminator 10 of FIG. 1 in a second time period. The stereoscopic display illuminator 10 includes a first light source 100, a curved mirror 200, a rotational wheel 300, an actuator 400, a multi-band filter 500, and an optical module 600. The first light source 100 is used for providing a first light beam, wherein the first light source 100 is a white light source. After being incident the optical module 600, the first light beam is guided to the rotational wheel 300 by the optical module 600. In the first time period, the first light beam is reflected back to the optical module 600 by the rotational wheel 300, and then is guided to the multi-band filter 500 along a path 120 by the optical module 600. The multi-band filter 500 is used for allowing a portion of the first light beam to pass through, and this portion of the first light beam can be a left-eye light beam. The left-eye light beam is then guided to a light emission position 700 by the optical module 600.

Reference is made to FIG. 2. In the second time period, the first light beam passes through the rotational wheel 300 and reaches the curved mirror 200. The first light beam is reflected back to the optical module 600 by the curved mirror 200, and is guided to the multi-band filter 500 along a path 130 by the optical module 600. The multi-band filter 500 is used for allowing another portion of the first light beam to be reflected, and this another portion of the first light beam can be a right-eye light beam, wherein the wavelengths of the right-eye light beam and the left-eye light beam mentioned above do not overlap. The right-eye light beam is then guided to the light emission position 700 by the optical module 600. Therefore, the left-eye light beam and the right-eye light beam are obtained in sequence by using the stereoscopic display illuminator 10 according to the present embodiment. It should be understood that the dashed arrow paths in FIG. 1 and FIG. 2 represent propagation paths of the first light beam.

It should be understood that although the light beam reaching the light emission position 700 in FIG. 1 is defined as the left-eye light beam, and the light beam reaching the emission position 700 in FIG. 2 is defined as the right-eye light beam, in other embodiments, the light beam reaching the light emission position 700 in FIG. 1 can be defined as the right-eye light beam, and the light beam reaching the emission position 700 in FIG. 2 can be defined as the left-eye light beam. The scope of the present invention should not be limited in this respect.

Figure 3:
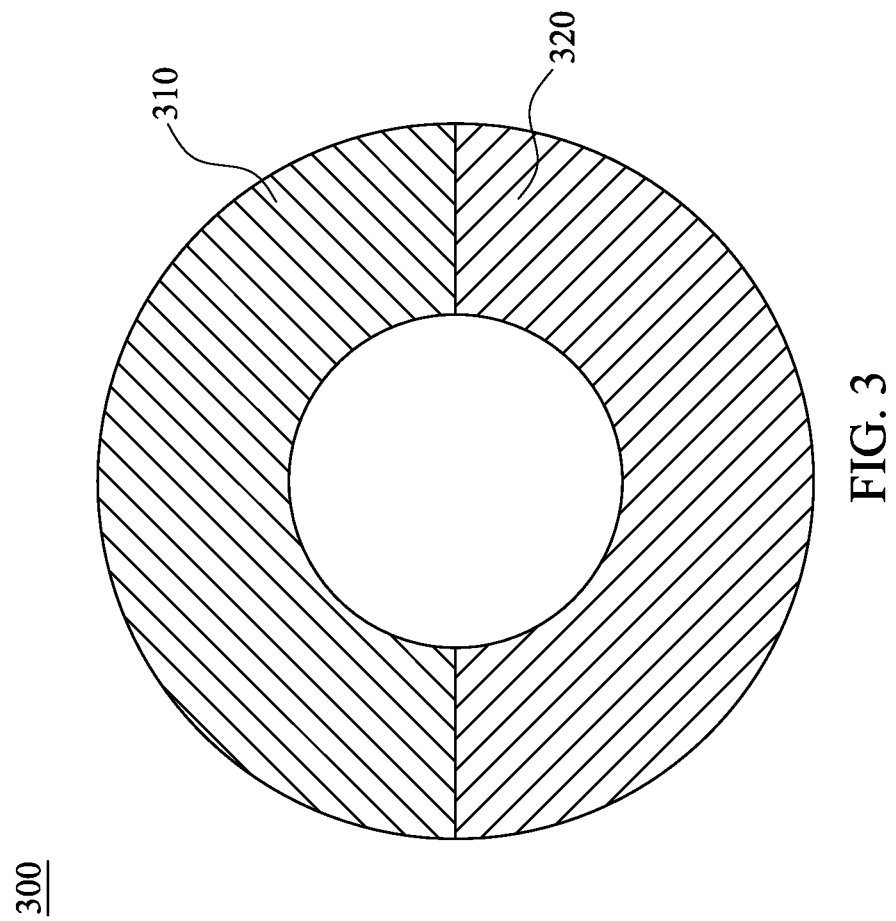
FIG. 3 is a front view of a rotational wheel of FIG. 1.

FIG. 3 is a front view of the rotational wheel 300 of FIG. 1. In greater detail, the rotational wheel 300 includes a first reflective segment 310 and a first transmission segment 320. The actuator 400 (see FIG. 1) is used for rotating the rotational wheel 300, such that the first reflective segment 310 and the first transmission segment 320 are disposed on a path of the first light beam in sequence. Therefore, the first light beam can be reflected by the rotational wheel 300, or pass through the rotational wheel 300 in sequence.

Figure 4:
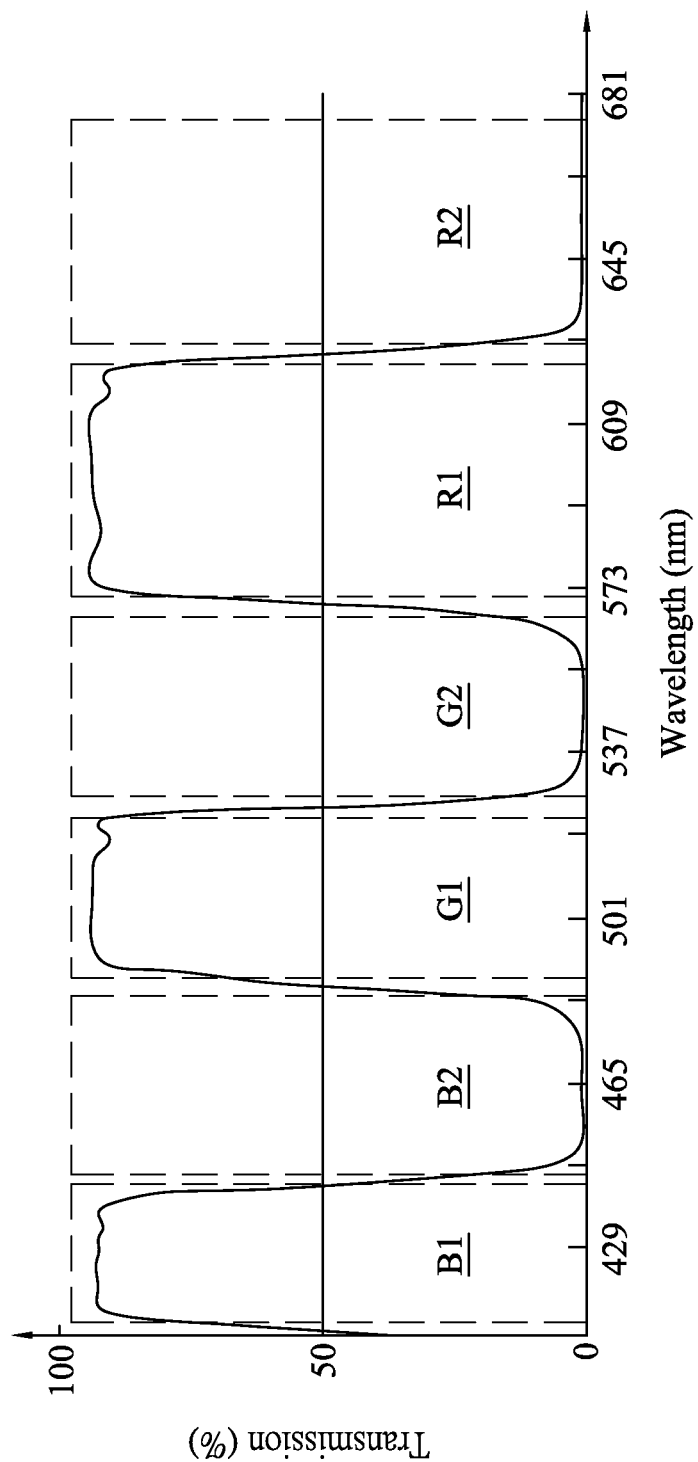
FIG. 4 is a spectrum of a multi-band filter of FIG. 1.

FIG. 4 is a spectrum of the multi-band filter 500 of FIG. 1. For clarity, the wavelength range of area B1 in FIG. 4 is from about 410 nm to 445 nm, the wavelength range of area B2 in FIG. 4 is from about 445 nm to 485 nm, the wavelength range of area G1 in FIG. 4 is from about 485 nm to 530 nm, the wavelength range of area G2 in FIG. 4 is from about 530 nm to 570 nm, the wavelength range of area R1 in FIG. 4 is from about 570 nm to 625 nm, and the wavelength range of area R2 in FIG. 4 is from about 625 nm to 680 nm. Each of the transmission and reflection ranges of the multi-band filter 500 is not limited to a single range, i.e., the multi-band filter 500 can allow a plurality of wavelength ranges of light to pass through, such as the light with wavelength ranges in the areas B1, G1, and R1 in this embodiment, and allow a plurality of wavelength ranges of light to be reflected, such as the light with wavelength ranges in the areas B2, G2, and R2 in this embodiment. Therefore, the light with wavelength ranges in the areas B1, G1, and R1 is the left-eye light beam mentioned above, and the light with wavelength ranges in the areas B2, G2, and R2 is the right-eye light beam mentioned above. It should be understood that the wavelength ranges mentioned above are illustrative only and should not limit the scope of the claimed invention. A person having ordinary skill in the art may select the transmission and reflection ranges of the multi-band filter 500 according to actual requirements.

Therefore, the stereoscopic display illuminator 10 can generate the left-eye light beam and the right-eye light beam in sequence according to the aforementioned structure. The details regarding how to obtain the left-eye light beams and the right-eye light beams from the stereoscopic display illuminator 10 according to the present embodiment are described in the following paragraphs.

Reference is made back to FIG. 1. The optical module 600 includes a first prism 610, a second prism 620, a third prism 630, and converging lenses 650 and 660. The first prism 610 has a first incident surface 612 and an emission surface 614. The first light source 100 is disposed adjacent to the first incident surface 612, and the light emission position 700 is disposed adjacent to the emission surface 614. The second prism 620 defines a first gap 616 with the first prism 610. The multi-band filter 500 is disposed between the second prism 620 and the third prism 630. The converging lenses 650 and 660 are disposed between the second prism 620 and the rotational wheel 300.

In the first time period, the first reflective segment 310 (see FIG. 3) of the rotational wheel 300 is disposed on the path of the first light beam by the actuator 400. The first light beam emitted from the first light source 100 propagates to the rotational wheel 300 along a path 110. The first light beam is first incident the first prism 610 from the first incident surface 612, and is incident the first gap 616 at an angle smaller than a total internal reflection angle of the interface of the first gap 616. Further, the first light beam passes through the first gap 616 and the second prism 620. Afterwards, the first light beam is converged by the converging lenses 650 and 660, and is reaching the first reflective segment 310 of the rotational wheel 300. The first light beam is then reflected back to the optical module 600 by the first reflective segment 310, and then is guided to the light emission position 700 along the path 120 by the optical module 600. The first light beam is first diverged to be parallel by the converging lenses 660 and 650 and is incident the third prism 630. The first light beam is then reflected to the multi-band filter 500 by the third prism 630. The portion of the first light beam, i.e., the light with wavelength ranges in the areas B1, G1, and R1 of FIG. 4 in the present embodiment, passes through the multi-band filter 500 and forms the left-eye light beam. The left-eye light beam is then incident the second prism 620 and incident the first gap 616 at an angle smaller than the total internal reflection angle of the interface of the first gap 616, such that the first light beam passes through the first gap 616 and the first prism 610 and reaches the light emission position 700.

Reference is back to FIG. 2. In the second time period, the first transmission segment 320 (see FIG. 3) of the rotational wheel 300 is disposed on the path of the first light beam by the actuator 400. The first light beam emitted from the first light source 100 propagates to the rotational wheel 300 along the path 110. The first light beam then passes through the first transmission segment 320, reaches the curved mirror 200, and then is guided to the light emission position 700 along the path 130 by the curved mirror 200 and the optical module 600. In particular, after being reflected by the curved mirror 200, the first light beam passes the outside of the rotational wheel 300, is diverged to be parallel by the converging lenses 660 and 650, and is incident the second prism 620. The first light beam is then incident the first gap 616 at an angle larger than the total internal reflection angle of the interface of the first gap 616, and is reflected to the multi-band filter 500 by the first gap 616. The another portion of the first light beam, i.e., the light with wavelength ranges in the areas B2, G2, and R2 of FIG. 4 in the present embodiment, is reflected by the multi-band filter 500 and forms the right-eye light beam. The right-eye light beam is then back to the second prism 620, is incident the first gap 616 at an angle smaller than the total internal reflection angle of the interface of the first gap 616, passes through the first gap 616 and the first prism 610, and reaches the light emission position 700. Through such an operation and configuration to rotate the rotational wheel 300, therefore, the stereoscopic display illuminator 10 can generate left-eye light beam and right-eye light beam in sequence.

In summary, since the rotational wheel 300 mentioned above does not filter light, the spot size of the first light beam impinging on the rotational wheel 300 can be reduced. Therefore, the size of the rotational wheel 300 can be smaller than regular color wheel, such that the whole size of the stereoscopic display illuminator 10 can be reduced. In addition, no matter along the path 120 and 130, the first light beam reaches the multi-band filter 500 with nearly parallel light, i.e., the first light beam is incident the multi-band filter 500 at a smaller incident angle, therefore, the wavelength ranges of the left-eye light beam and the right-eye light beam generated by the stereoscopic display illuminator 10 are prevented to be overlapped due to wavelength shift, and the crosstalk between the left-eye image light beam and the right-eye image light beam can be prevented.

In one or more embodiments, an angle can be between the first light beam and a normal line of the first incident surface 612 of the first prism 610, i.e., the first light beam is not incident the first incident surface 612 normally, such that the position of the first light beam impinging to the rotational wheel 300 is off an optical axis 12 of the stereoscopic display illuminator 10. Therefore, after passing through the rotational wheel 300 and being reflected by the curved mirror 200, the first light beam can propagate from outside of the rotational wheel 300, i.e., the another side of the rotational wheel 300 relative to the optical axis 12, and be back to the optical module 600. Moreover, the first light beam is not incident the first incident surface 612 normally, such that the first light beam is incident the first gap 616 along the path 110 at an angle smaller than the total internal reflection angle of the interface of the first gap 616, but is incident the first gap 616 along the path 130 at an angle larger than the total internal reflection angle of the interface of the first gap 616 after the first light beam being reflected by the optical module 600 and the curved mirror 200 and propagating off of the optical axis 12. Therefore, the first light beam is reflected by the first gap 616 and reaches the multi-band filter 500. The another portion of the first light beam is then reflected by the multi-band filter 500, and is incident the first gap 616 at angle smaller than the total internal reflection of the interface of the first gap 616, such that the first light beam can pass through the first gap 616 again.

In this embodiment, although the curved mirror 200 can reflect the first light beam from the rotational wheel 300 back to the rotational wheel 300, the size of the curved mirror 200 has to be larger if the incident angle of the first light beam is large. Therefore, in other embodiments, the stereoscopic display illuminator 10 can further include a copy lens 800 disposed between the rotational wheel 300 and the curved mirror 200, where the copy lens 800 is used for converging the first light beam passing through the rotational wheel 300, such that the incident angle of the first light beam reaching the curved mirror 200 can be small, and the size of the curved mirror 200 can be reduced. Moreover, the curved mirror 200 can be a spherical mirror. However, the scope of the claimed invention should not be limited in this respect.

It should be understood that the number of the converging lenses 650 and 660 of the optical module 600 in FIG. 1 and FIG. 2 are illustrative only and should not limit the scope of the claimed invention. The converging lenses 650 and 660 are used for converging light beams, such that the spot size of the first light beam impinging on the rotational wheel 300 can be reduced. Therefore, in other embodiments, the number of the converging lens can be one or more than two. A person has ordinary skill can select the number of the converging lens of the optical module 600 according to actual requirements.

In one or more embodiments, the stereoscopic display illuminator 10 can be switched from a 3D display mode to a 2D display mode for convenience. Reference is made back to FIG. 1. When the stereoscopic display illuminator 10 of the present embodiment is switched to the 2D display mode, the first reflective segment 310 (see FIG. 3) of the rotational wheel 300 is fixed on the path of the first light beam by the actuator 400, and the multi-band filter 500 is dismounted. Therefore, the first light beam emitted from the first light source 100 propagates to the rotational wheel 300 along the path 110, and is reflected back to the optical module 600 by the rotational wheel 300. Along the path 120, the first light beam then passes through the adjacent position of the third prism 630 and the second prism 620, i.e., the position where the multi-band filter 500 is mounted in the 3D display mode, and reaches the light emission position 700. Since the first light beam does not pass through the multi-band filter 500 in the 2D display mode, all wavelength ranges of the first light beam can reach the light emission position 700.

However, the structure of the stereoscopic display illuminator 10 in the 2D display mode is not limited by the structure mentioned above. Reference is made back to FIG. 2. In other embodiments, the first transmission segment 320 (see FIG. 3) of the rotational wheel 300 can be fixed on the path of the first light beam by the actuator 400, and a reflective mirror can be inserted into the adjacent position of the second prism 620 and the third prism 630, where the reflective mirror faces the second prism 620. The reflective mirror is disposed adjacent to one side of the multi-band filter 500. Therefore, the first light beam emitted from the first light source 100 propagates to the rotational wheel 300 along the path 110, passes through the first transmission segment 320, reaches the curved mirror 200, and is reflected back to the optical module 600 by the curved mirror 200. Along the path 130, the first light beam is then reflected to the reflective mirror by the second prism 620, and is reflected to the light emission position 700 by the reflective mirror. In this embodiment, all wavelength ranges of the first light beam can reach the light emission position 700 by the reflection of the reflective mirror.

Figure 5:
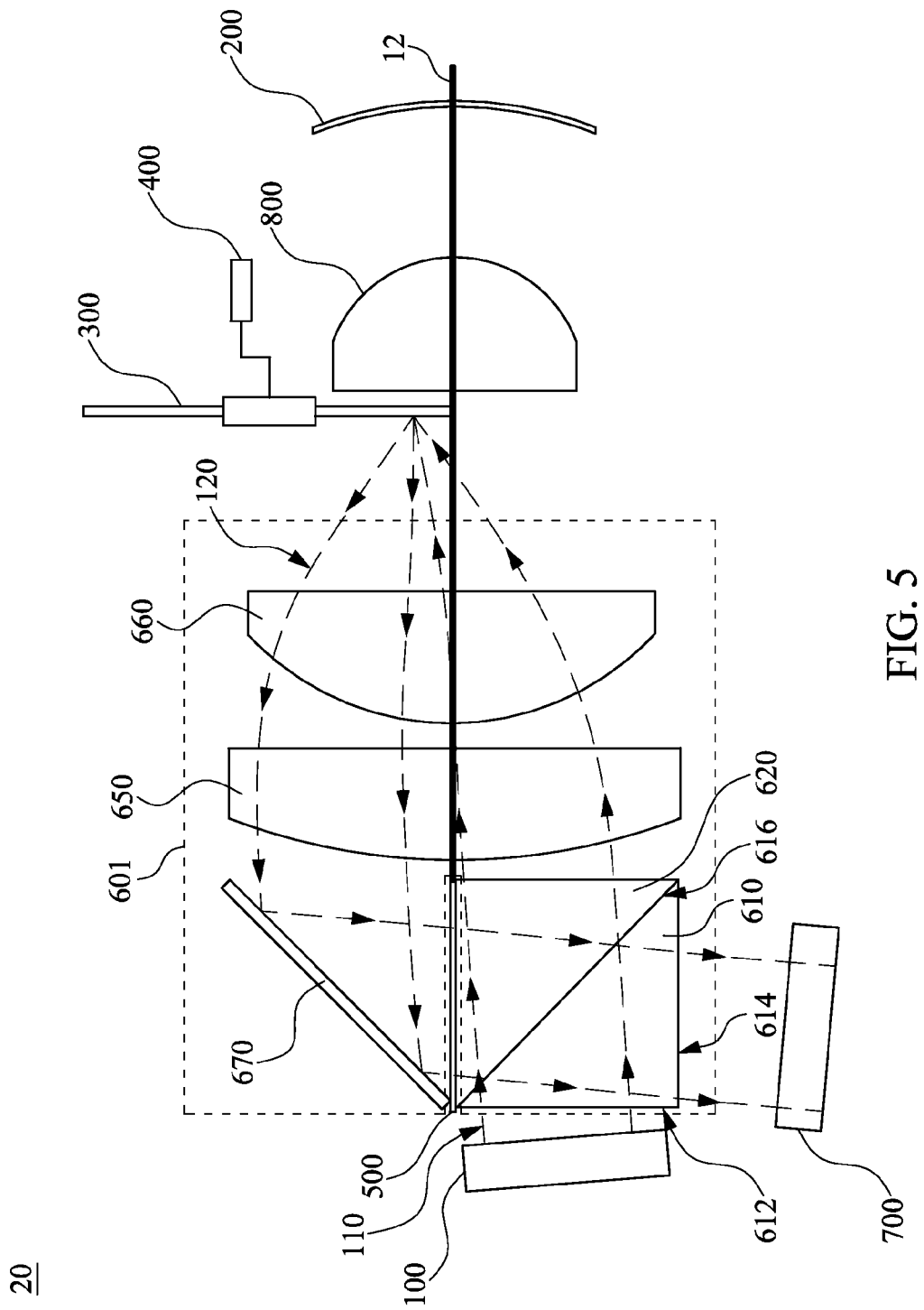
FIG. 5 is a schematic diagram of a stereoscopic display illuminator in the first time period according to another embodiment of the present invention.

FIG. 5 is a schematic diagram of a stereoscopic display illuminator 20 in the first time period according to another embodiment of the present invention. The difference between the present embodiment and the embodiment in FIG. 1 is the elements of the optical module. In this embodiment, an optical module 601 includes the first prism 610, the second prism 620, the converging lenses 650 and 660, and a reflective mirror 670. The first prism 610 has the first incident surface 612 and the emission surface 614. The first light source 100 is disposed adjacent to the first incident surface 612, and the light emission position 700 is disposed adjacent to the emission surface 614. The second prism 620 defines the first gap 616 with the first prism 610. The multi-band filter 500 is disposed between the second prism 620 and the reflective mirror 670. The converging lenses 650 and 660 are disposed between the second prism 620 and the rotational wheel 300.

Therefore, in the first time period, the first reflective segment 310 (see FIG. 3) of the rotational wheel 300 is disposed on the path of the first light beam by the actuator 400. The first light beam emitted from the first light source 100 propagates to the rotational wheel 300 along the path 110. The first light beam is then reflected back to the optical module 601 by the first reflective segment 310, and then is guided to the light emission position 700 along the path 120 by the optical module 601. The first light beam is first diverged to be parallel by the converging lenses 660 and 650 and is incident the reflective mirror 670. The first light beam is then reflected to the multi-band filter 500 by the reflective mirror 670. The portion of the first light beam, i.e., the light with wavelength ranges in the areas B1, G1, and R1 of FIG. 4 in the present embodiment, passes through the multi-band filter 500 and forms the left-eye light beam. The left-eye light beam is then incident the second prism 620 and is incident the first gap 616 at an angle smaller than the total internal reflection angle of the interface of the first gap 616, such that the first light beam passes through the first gap 616 and the first prism 610 and reaches the light emission position 700.

Moreover, in the second time period, since the details of first light beam forming the right-eye light beam is the same as the embodiment of the FIG. 2 except the third prism 630 is replaced by the reflective mirror 670 of FIG. 5, therefore, a description in this regard will not be provided hereinafter. Other features of the stereoscopic display illuminator 20 are the same as those of the stereoscopic display illuminator 10 shown in FIG. 1 and FIG. 2, and therefore, a description in this regard will not be provided hereinafter.

Figure 6:
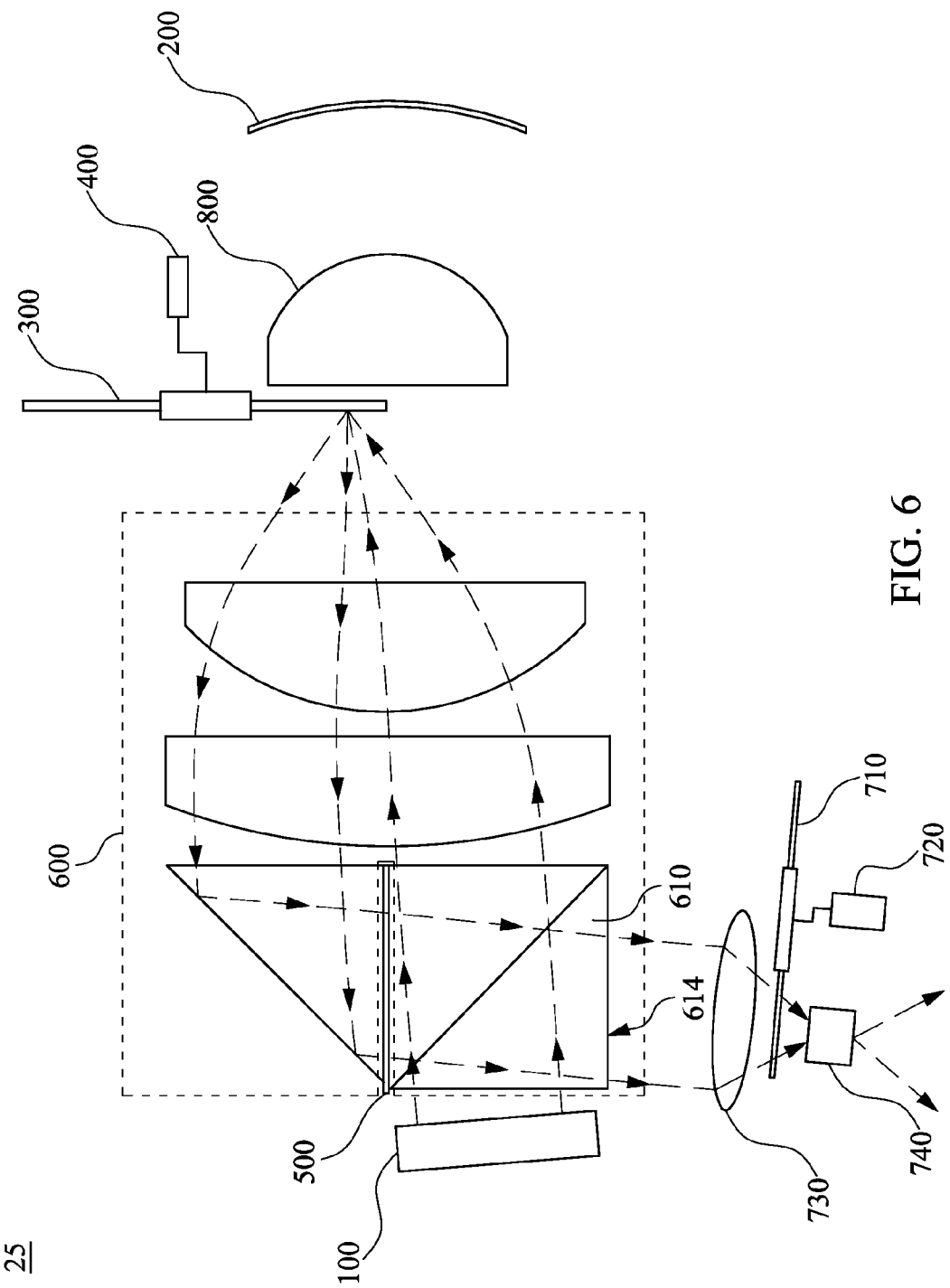
FIG. 6 is a schematic diagram of a stereoscopic display illuminator in the first time period according to yet another embodiment of the present invention.

FIG. 6 is a schematic diagram of a stereoscopic display illuminator 25 in the first time period according to yet another embodiment of the present invention. Although only the optical path of the left-eye light beam is shown in FIG. 6, the optical path of the right-eye light beam after passing through the emission surface 614 is the same as that of the left-eye light beam. In order to split the left- and the right-eye light beams into a plurality of primary-color left- and right-eye light beams, the stereoscopic display illuminator 25 can further include a color wheel 710 and a color wheel actuator 720. The color wheel 710 is disposed on the light emission position 700 (see FIG. 1), and is used for filtering a portion of the left- and the right-eye light beams. The color wheel actuator 720 is used for rotating the color wheel 710. The color wheel 710 includes a plurality of filtering segments, which can be disposed on the path of the left- and the right-eye light beams in sequence when the color wheel actuator 720 rotates the color wheel 710. Therefore, the color wheel 710 can split the left- (or right-)eye light beam into a plurality of the primary-color left-(or right-)eye light beams. In greater detail, take RGB primary colors for example, the color wheel 710 can include a red primary-color filtering segment, a green primary-color filtering segment, and a blue primary-color filtering segment. When the first reflective segment 310 of the rotational wheel 300 (see FIG. 3) is disposed on the path of the first light beam, the light beam reaching the light emission position 700 is the left-eye light beam. After passing through the color wheel 710, the left-eye light beam can be split into a red primary-color left-eye light beam (whose wavelength range is corresponding to the area R1 in FIG. 4), a green primary-color left-eye light beam (whose wavelength range is corresponding to the area G1 in FIG. 4), and a blue primary-color left-eye light beam (whose wavelength range is corresponding to the area B1 in FIG. 4) in sequence. When the first transmission segment 320 of the rotational wheel 300 (see FIG. 3) is disposed on the path of the first light beam, the light beam reaching the light emission position 700 is the right-eye light beam. After passing through the color wheel 710, the right-eye light beam can be split into a red primary-color right-eye light beam (whose wavelength range is corresponding to the area R2 in FIG. 4), a green primary-color right-eye light beam (whose wavelength range is corresponding to the area G2 in FIG. 4), and a blue primary-color right-eye light beam (whose wavelength range is corresponding to the area B2 in FIG. 4) in sequence. The rotational speed of the color wheel 710 is twice of that of the rotational wheel 300. In other words, when the rotational wheel 300 rotates half circle, i.e., the period of one of the first reflective segment 310 and the first transmission segment 320 is disposed on the path of the first light beam, the color wheel 710 rotates a circle, i.e., the red primary-color filtering segment, the green primary-color filtering segment, and the blue primary-color filtering segment have all passed the path of the left and the right-eye light beams in sequence.

Moreover, the color of the color wheel 710 is not limited from RGB primary colors. In one or more embodiments, the color wheel 710 can further include a yellow primary-color filtering segment for enhancing the brilliance of the images. The multi-band filter 500 can also be designed to have corresponding spectrum. It should be understood that the colors of the primary-color filtering segments are illustrative only and should not limit the scope of the present invention. A person having ordinary skill in the art may select proper colors of the primary-color filtering segments according to actual requirements.

In one or more embodiments, the stereoscopic display illuminator 25 can further include a lens 730 and a light tunnel 740. The lens 730 is disposed between the color wheel 710 and the emission surface 614 of the first prism 610, and the light tunnel 740 is disposed at a side of the color wheel 710 opposite to the lens 730. The light tunnel 740 is used for uniform the primary-color left- and the primary-color right-eye light beams passing through the color wheel 710 to enhance the light quality. However, the scope of the claimed invention should not be limited in this respect.

Although the stereoscopic display illuminator 25 of FIG. 6 includes the optical module 600, the optical module 600 can be replaced to be the optical module 601 (see FIG. 5) in other embodiments, and the scope of the claimed invention should not be limited in this respect. As to other relevant details are all the same as the embodiment shown in FIG. 1 and FIG. 2, and, therefore, these are not repeated hereinafter.

Figure 7:
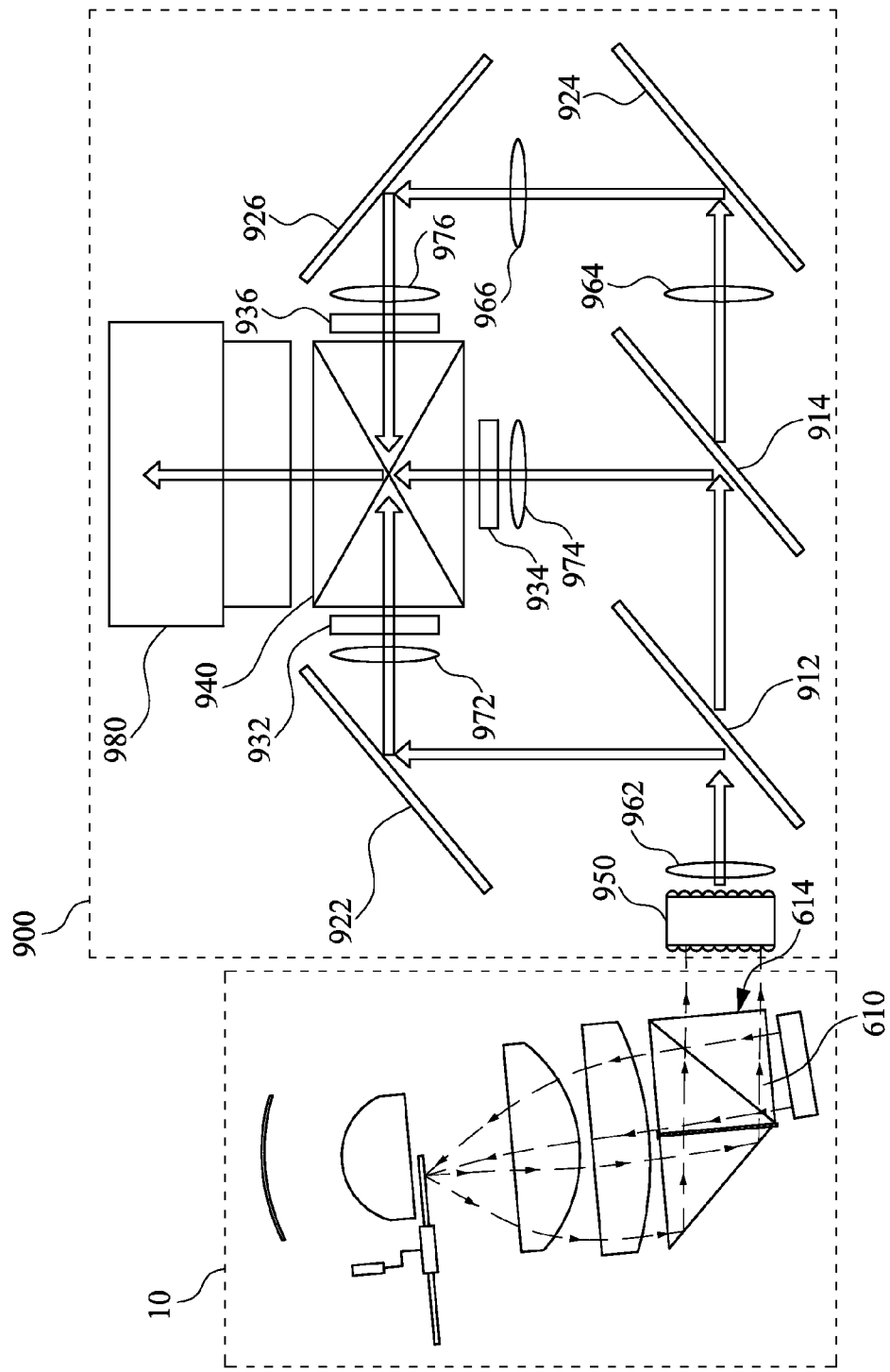
FIG. 7 is a schematic diagram of a stereoscopic display device in the first time period according to one embodiment of the present invention.

Another aspect of the present invention provides a stereoscopic display device. FIG. 7 is a schematic diagram of a stereoscopic display device in the first time period according to one embodiment of the present invention. Although only the optical path of the left-eye light beam is shown in FIG. 7, the optical path of the right-eye light beam leaving the stereoscopic display illuminator 10 is the same as that of the left-eye light beam. The stereoscopic display device includes the stereoscopic display illuminator 10 mentioned above and a light modulating mechanism 900. The light modulating mechanism 900 is used for modulating the left- and the right-eye light beams generated from the stereoscopic display illuminator 10 to a plurality of left- and right-eye image light beams. The light modulating mechanism 900 includes dichroic mirrors 912 and 914, liquid crystal panels 932, 934, and 936, and a light combining prism 940. The dichroic mirror 912 is disposed at the light emission position 700 (see FIG. 1) of the stereoscopic display illuminator 10, and is used for splitting the left- and the right-eye light beams to a plurality of primary-color light beams, and the dichroic mirror 914 is used for further splitting light beams. The liquid crystal panels 932, 934, and 936 are used for forming the primary-color light beams to a plurality of image light beams. The light combining prism 940 is used for combining the image light beams and projecting to a lens 980.

In one or more embodiments, the light modulating mechanism 900 further includes reflective mirrors 922, 924, and 926, a lens array 950, and a plurality of lenses 962, 964, 966, 972, 974, and 976. The reflective mirrors 922, 924, and 926 are respectively guiding portions of the primary-color light beams to the liquid crystal panels 932 and 936. The lens array 950 is disposed between the dichroic mirror 912 and the emission surface 614 of the first prism 610 of the stereoscopic display illuminator 10, and the lens array 950 is used for uniform the left- and the right-eye light beams. The lens 962 is disposed between the lens array 950 and the dichroic mirror 912, the lens 964 is disposed between the dichroic mirror 914 and the reflective mirror 924, the lens 966 is disposed between the reflective mirror 924 and 926, the lens 972 is disposed between the reflective mirror 922 and the liquid crystal panel 932, the lens 974 is disposed between the dichroic mirror 914 and the liquid crystal panel 934, and the lens 976 is disposed between the reflective mirror 926 and the liquid crystal panel 936.

In greater detail, take RGB primary colors for example, after the stereoscopic display illuminator 10 generates the left-eye light beam, the left-eye light beam passes through the lens array 950 and the lens 962 and reaches the dichroic mirror 912. The left-eye light beam is then split into a blue left-eye light beam and a yellow left-eye light beam by the dichroic mirror 912. The blue left-eye light beam is then reflected to the reflective mirror 922, passes through the lens 972, and reaches the liquid crystal panel 932. The liquid crystal panel 932 can modulate the blue left-eye light beam to a blue left-eye image light beam. The blue left-eye image light beam is then incident a side of the light combining prism 940, and then is guided to the lens 980 by the light combining prism 940. On the other hand, the yellow left-eye light beam reaches the dichroic mirror 914 which splits the yellow left-eye light beam into a green left-eye light beam and a red left-eye light beam. The green left-eye light beam is then reflected to the lens 974 and reaches the liquid crystal panel 934 which modulates the green left-eye light beam to a green left-eye image light beam. The green left-eye image light beam is incident another side of the light combining prism 940, and then is guided to the lens 980 by the light combining prism 940. On the other hand, the red left-eye light beam passes through the lens 964, 966, and 976, and is guided to the liquid crystal panel 936 by the reflective mirrors 924 and 926. The liquid crystal panel 936 modulates the red left-eye light beam to a red left-eye image light beam. The red left-eye image light beam is incident yet another side of the light combining prism 940, and then is guided to the lens 980 by the light combining prism 940. Therefore, as long as switch on the liquid crystal panels 932, 934, and 936 in sequence, the blue left-eye image light beam, the green left-eye image light beam, and the red left-eye image light beam are obtained in front of the lens 980 in sequence. Since the optical mechanism of the light modulating mechanism 900 with respect to the right-eye light beam is the same as the optical mechanism of the light modulating mechanism 900 with respect to the left-eye light beam, details of the right-eye light beam are not repeated hereinafter.

Although the stereoscopic display device of FIG. 7 includes the stereoscopic display illuminator 10, the stereoscopic display illuminator 10 can be replaced to be the stereoscopic display illuminator 20 (see FIG. 5) in other embodiments, and the scope of the claimed invention should not be limited in this respect. As to other relevant details are all the same as the embodiment shown in FIG. 1 and FIG. 2, and, therefore, these are not repeated hereinafter.

Figure 8:
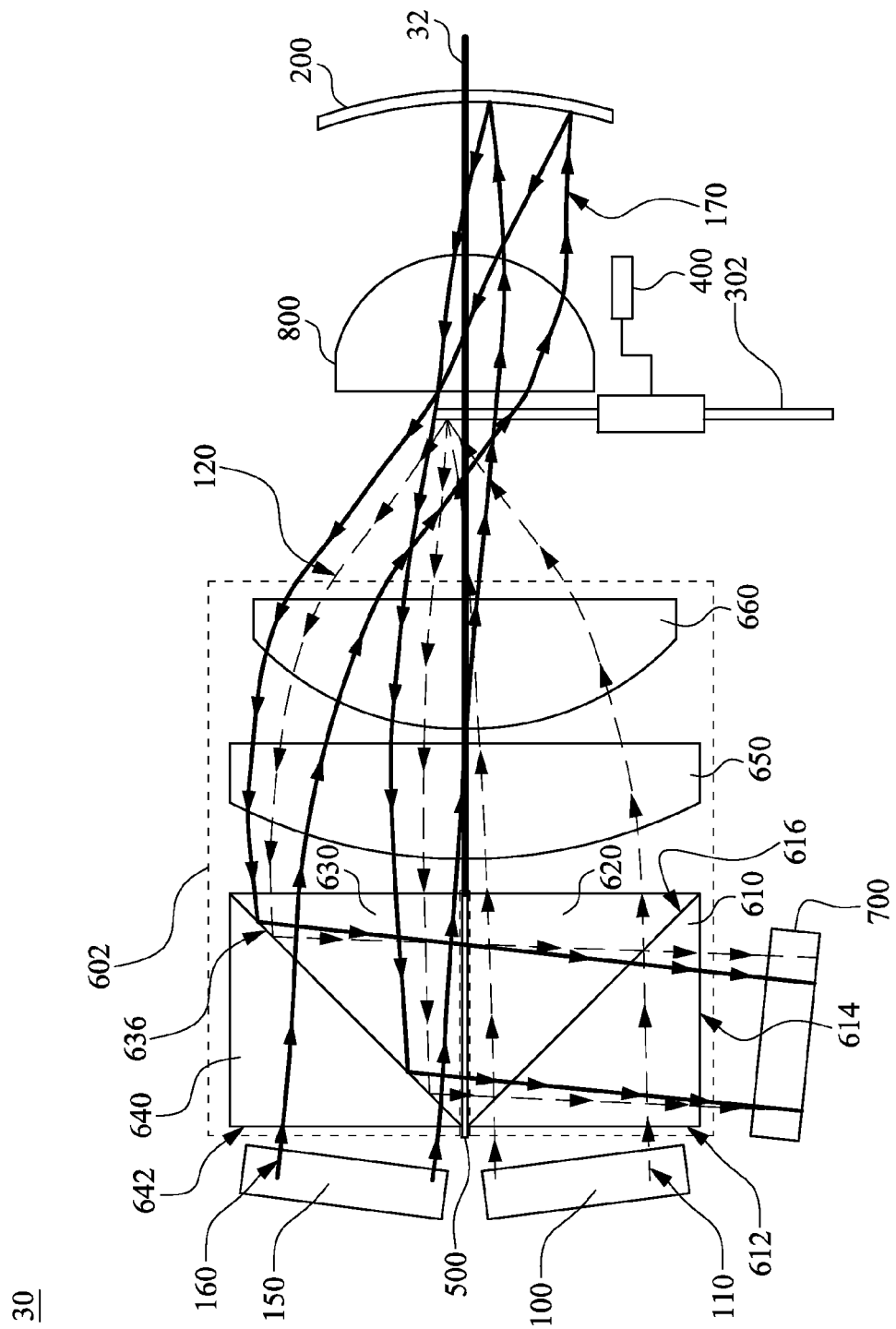
FIG. 8 is a schematic diagram of a stereoscopic display illuminator in a to first time period according to yet another embodiment of the present invention.
Figure 9:
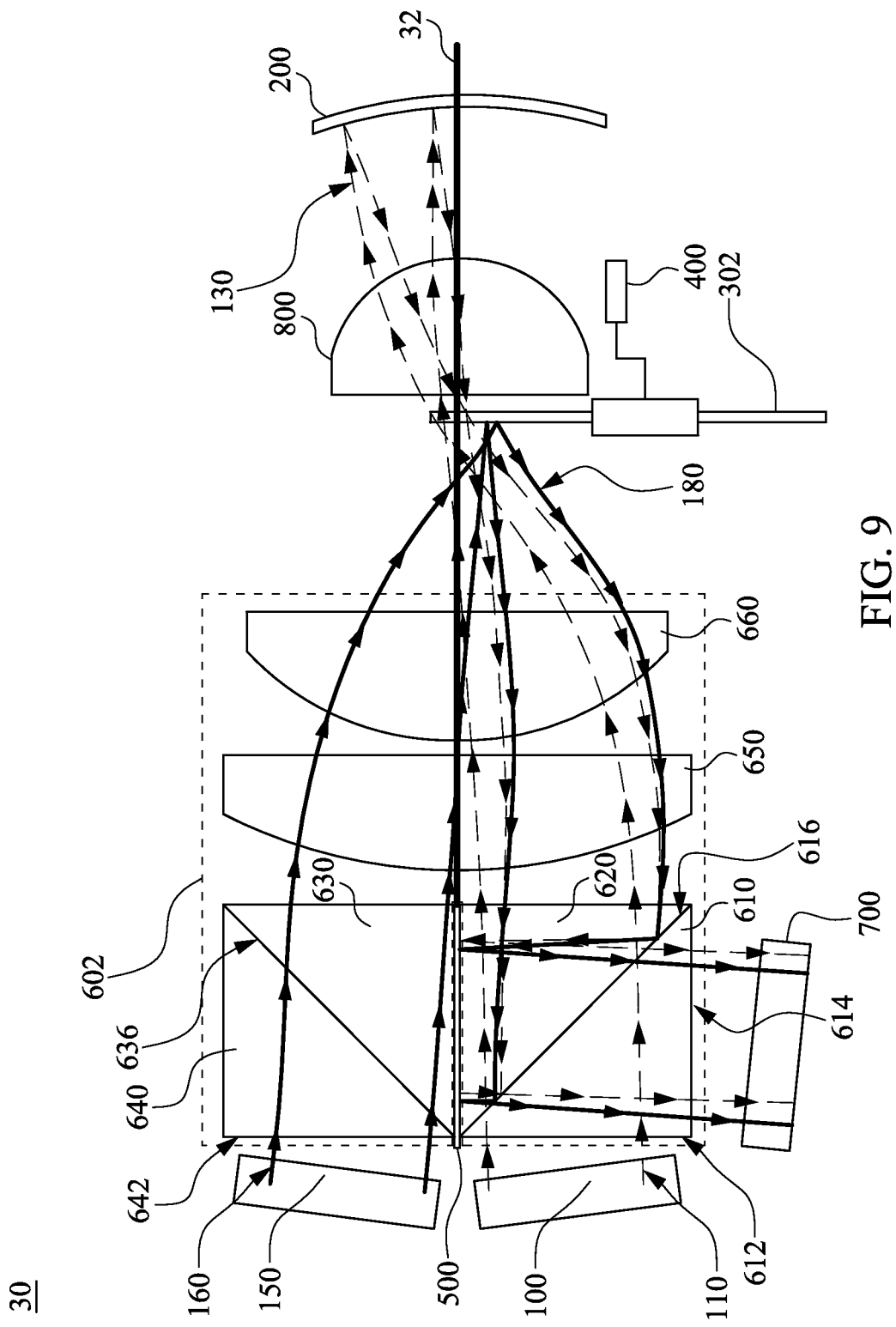
FIG. 9 is a schematic diagram of the stereoscopic display illuminator of FIG. 8 in a second time period.

In one or more embodiments, the stereoscopic display illuminator can include two light sources to enhance the light intensity. In greater detail, references are made to FIG. 8 and FIG. 9. FIG. 8 is a schematic diagram of a stereoscopic display illuminator 30 in the first time period according to yet another embodiment of the present invention, and FIG. 9 is a schematic diagram of the stereoscopic display illuminator 30 of FIG. 8 in the second time period. It should be noted that the dashed arrows in FIG. 8 and FIG. 9 represent the path of the first light beam, and the solid arrows in FIG. 8 and FIG. 9 represent the path of a second light beam. The stereoscopic display illuminator 30 includes the first light source 100, a second light source 150, the curved mirror 200, the rotational wheel 302, the actuator 400, the multi-band filter 500, and an optical module 602. The first light source 100 is used for providing the first light beam, and the second light source 150 is used for providing the second light beam, wherein the first light source 100 and the second light source 150 are white light source. After being incident the optical module 602, the first light beam is guided to the rotational wheel 302 by the optical module 602.

Reference is made to FIG. 8. In the first time period, the first light beam is reflected back to the optical module 602 by the rotational wheel 302, and then is guided to the multi-band filter 500 along the path 120 by the optical module 602. The multi-band filter 500 is used for allowing the portion of the first light beam to pass through, and this portion of the first light beam can be the left-eye light beam. The left-eye light beam is then guided to the light emission position 700 by the optical module 602. In the same time period, the second light beam passes through the rotational wheel 302 and reaches the curved mirror 200. The second light beam is reflected back to the optical module 602 by the curved mirror 200, and is guided to the multi-band filter 500 along a path 170 by the optical module 602. The multi-band filter 500 is used for allowing a portion of the second light beam to pass through, and this portion of the second light beam is also the left-eye light beam. The left-eye light beam is then guided to the light emission position 700 by the optical module 602. Therefore, the light intensity of the stereoscopic display illuminator 30 is twice of the stereoscopic display illuminator 10 of FIG. 1 since the first light beam and the second light beam all form the left-eye light beam in the first time period.

Reference is made to FIG. 9. In the second time period, the first light beam passes through the rotational wheel 302 and reaches the curved mirror 200. The first light beam is reflected back to the optical module 602 by the curved mirror 200, and is guided to the multi-band filter 500 along the path 130 by the optical module 602. The multi-band filter 500 is used for allowing the another portion of the first light beam to be reflected, and this another portion of the first light beam can be the right-eye light beam, wherein the wavelengths of the right-eye light beam and the left-eye light beam mentioned above do not overlap. The right-eye light beam is then guided to the light emission position 700 by the optical module 600. In the same time period, the second light beam is reflected back to the optical module 602 by the rotational wheel 302, and then is guided to the multi-band filter 500 along a path 180 by the optical module 602. The multi-band filter 500 is used for allowing another portion of the second light beam to be reflected, and this another portion of the second light beam is also the right-eye light beam. The right-eye light beam is then guided to a light emission position 700 by the optical module 602. Therefore, the light intensity of the stereoscopic display illuminator 30 is twice of the stereoscopic display illuminator 10 of FIG. 1 since the first light beam and the second light beam all form the right-eye light beam in the second time period.

It should be understood that although the light beam reaching the light emission position 700 in FIG. 8 is defined as the left-eye light beam, and the light beam reaching the emission position 700 in FIG. 9 is defined as the right-eye light beam, in other embodiments, the light beam reaching the light emission position 700 in FIG. 8 can be defined as the right-eye light beam, and the light beam reaching the emission position 700 in FIG. 9 can be defined as the left-eye light beam.

Figure 10:
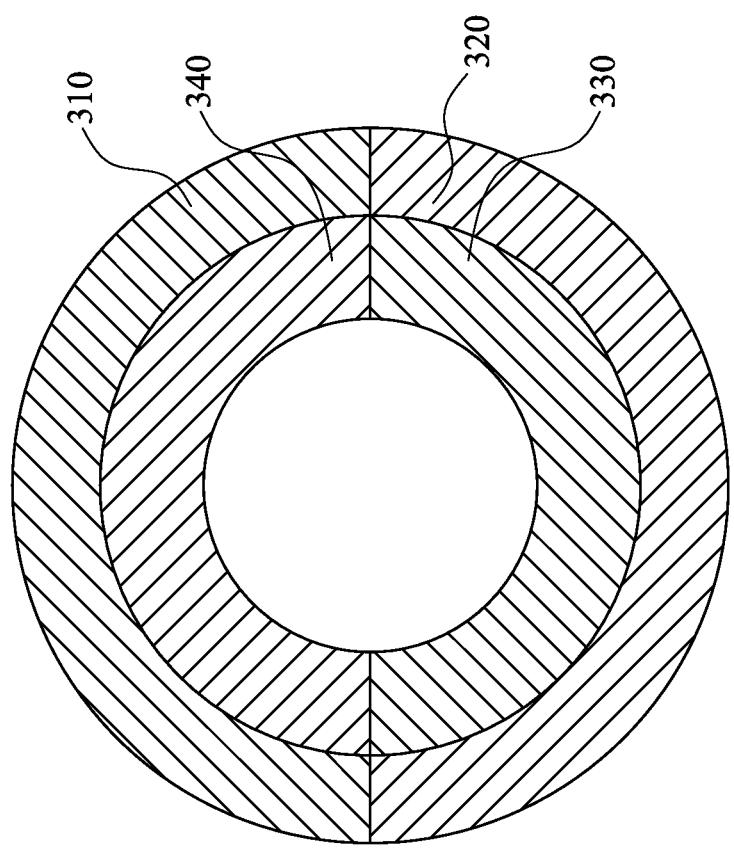
FIG. 10 is a front view of the rotational wheel of FIG. 8.

FIG. 10 is a front view of the rotational wheel 302 of FIG. 8. In greater detail, the rotational wheel 302 includes the first reflective segment 310, the first transmission segment 320, a second reflective segment 330, and a second transmission segment 340. The actuator 400 (see FIG. 8) is used for rotating the rotational wheel 302, such that the first reflective segment 310 and the first transmission segment 320 are disposed on the path of the first light beam in the first time period and in the second time period, respectively, and the second reflective segment 330 and the second transmission segment 340 are disposed on the path of the second light beam in the second time period and in the first time period, respectively. Therefore, both of the first light beam and the second light beam can be reflected by the rotational wheel 302, or pass through the rotational wheel 302 in sequence.

The details regarding how to obtain the left-eye light beam and the right-eye light beam from the stereoscopic display illuminator 30 according to the present embodiment are described in the following paragraphs. Reference is made back to FIG. 8. The optical module 602 includes the first prism 610, the second prism 620, the third prism 630, a fourth prism 640, and the converging lenses 650 and 660. The first prism 610 has the first incident surface 612 and the emission surface 614. The first light source 100 is disposed adjacent to the first incident surface 612, and the light emission position 700 is disposed adjacent to the emission surface 614. The second prism 620 defines the first gap 616 with the first prism 610. The multi-band filter 500 is disposed between the second prism 620 and the third prism 630. The fourth prism 640 defines a second gap 636 with the third prism 630, and the fourth prism 640 has a second incident surface 642. The second light source 150 is disposed adjacent to the second incident surface 642. The converging lenses 650 and 660 are disposed between the second prism 620 and the rotational wheel 302.

In the first time period, the first reflective segment 310 (see FIG. 10) of the rotational wheel 302 is disposed on the path of the first light beam by the actuator 400. The first light beam emitted from the first light source 100 propagates to the rotational wheel 302 along the path 110. The first light beam is first incident the first prism 610 from the first incident surface 612, and is incident the first gap 616 at an angle smaller than the total internal reflection angle of the interface of the first gap 616. Afterwards, the first light beam passes through the first gap 616 and through the second prism 620, is converged by the converging lenses 650 and 660, and reaches the first reflective segment 310 of the rotational wheel 302. The first light beam is then reflected back to the optical module 602 by the first reflective segment 310, and then is guided to the light emission position 700 along the path 120 by the optical module 602. The first light beam is first diverged to be parallel by the converging lenses 660 and 650, is incident the third prism 630, is incident the second gap 636 at an angle larger than a total internal reflection angle of the interface of the second gap 636, and is reflected to the multi-band filter 500 by the second gap 636. The portion of the first light beam, i.e., the light with wavelength ranges in the areas B1, G1, and R1 of FIG. 4 in the present embodiment, passes through the multi-band filter 500 and forms the left-eye light beam. The left-eye light beam is then incident the second prism 620 and is incident the first gap 616 at an angle smaller than the total internal reflection angle of the interface of the first gap 616, such that the first light beam passes through the first gap 616 and the first prism 610 and reaches the light emission position 700.

In the same time period, the second transmission segment 340 (see FIG. 10) of the rotational wheel 302 is disposed on the path of the second light beam. The second light beam emitted from the second light source 150 propagates to the rotational wheel 302 along a path 160. The second light beam is first incident the fourth prism 640 from the second incident surface 642, is incident the second gap 636 at an angle smaller than the total internal reflection angle of the interface of the second gap 636, and passes through the second gap 636. The second light beam then passes through the third prism 630, is converged by the converging lenses 650 and 660, and reaches the second transmission segment 340 of the rotational wheel 302. The second light beam then passes through the second transmission segment 340, reaches the curved mirror 200, and is guided to the light emission position 700 along the path 170 by the curved mirror 200 and the optical module 602. After being reflected by the curved mirror 200, the second light beam passes the outside of the rotational wheel 302, is diverged to be parallel by the converging lenses 660 and 650, and is incident the third prism 630. The second light beam is then incident the second gap 636 at an angle larger than the total internal reflection angle of the interface of the second gap 636, and is reflected to the multi-band filter 500 by the second gap 636. The portion of the second light beam, i.e., the light with wavelength ranges in the areas B1, G1, and R1 of FIG. 4 in the present embodiment, passes through the multi-band filter 500 and forms the left-eye light beam. The left-eye light beam is then passes through the first gap 616 and reaches the light emission position 700.

Reference is back to FIG. 9. In the second time period, the first transmission segment 320 (see FIG. 10) of the rotational wheel 302 is disposed on the path of the first light beam by the actuator 400. The first light beam emitted from the first light source 100 propagates to the rotational wheel 302 along the path 110. The first light beam then passes through the first transmission segment 320, reaches the curved mirror 200, and then is guided to the light emission position 700 along the path 130 by the curved mirror 200 and the optical module 602. After being reflected by the curved mirror 200, the first light beam is back to the rotational wheel 302, passes through the first transmission segment 320 again, is diverged to be parallel by the converging lenses 660 and 650, and is incident the second prism 620. The first light beam is then incident the first gap 616 at an angle larger than the total internal reflection angle of the interface of the first gap 616, and is reflected to the multi-band filter 500 by the first gap 616. The another portion of the first light beam, i.e., the light with wavelength ranges in the areas B2, G2, and R2 of FIG. 4 in the present embodiment, is reflected by the multi-band filter 500 and forms the right-eye light beam. The right-eye light beam is then back to the second prism 620, is incident the first gap 616 at an angle smaller than the total internal reflection angle of the interface of the first gap 616, passes through the first gap 616 and the first prism 610, and reaches the light emission position 700.

In the same time period, the second reflective segment 330 (see FIG. 10) of the rotational wheel 302 is disposed on the path of the second light beam by the actuator 400. The second light beam emitted from the second light source 150 propagates to the rotational wheel 302 along the path 160. The second light beam is then reflected back to the optical module 602 by the second reflective segment 330, and then is guided to the light emission position 700 along the path 180 by the optical module 602. The second light beam is first diverged to be parallel by the converging lenses 660 and 650, is incident the second prism 620, is incident the first gap 616 at an angle larger than the total internal reflection angle of the interface of the first gap 616, and is reflected to the multi-band filter 500 by the first gap 616. The another portion of the second light beam, i.e., the light with wavelength ranges in the areas B2, G2, and R2 of FIG. 4 in the present embodiment, is reflected by the multi-band filter 500 and forms the right-eye light beam. The right-eye light beam is then back to the second prism 620, is incident the first gap 616 at an angle smaller than the total internal reflection angle of the interface of the first gap 616, passes through the first gap 616 and the first prism 610, and reaches the light emission position 700. Through such an operation and configuration to rotate the rotational wheel 302, therefore, the stereoscopic display illuminator 30 can generate the left-eye light beam and the right-eye light beam in sequence.

In summary, since the rotational wheel 302 mentioned above does not filter light, the spot sizes of the first light beam and the second light beam impinging on the rotational wheel 302 can be reduced. Therefore, the size of the rotational wheel 302 can be smaller than regular color wheel, such that the whole size of the stereoscopic display illuminator 30 can be reduced. In addition, the first light beam reaches the multi-band filter 500 with nearly parallel light, i.e., the first light beam and the second light beam are incident the multi-band filter 500 at smaller incident angles, therefore, the wavelength ranges of the left-eye light beam and right-eye light beam generated by the stereoscopic display illuminator 30 are prevented to be overlapped due to wavelength shift, and the crosstalk between the left-eye image and the right-eye image can be prevented. Moreover, the stereoscopic display illuminator 30 can enhance the light intensity through using the first light source 100, the second light source 150, the rotational wheel 302, and the optical module 602.

In one or more embodiments, a first angle can be between the first light beam and the normal line of the first incident surface 612 of the first prism 610, i.e., the first light beam is not incident the first incident surface 612 normally, such that the position of the first light beam impinging to the rotational wheel 302 is off of an optical axis 32 of the stereoscopic display illuminator 30. Therefore, after passing through the rotational wheel 302 and being reflected by the curved mirror 200, the first light beam propagating along the path 110 can pass through the rotational wheel 302 off of the other side of the optical axis 32 and be back to the optical module 602. In other words, the first transmission segment 320 is disposed on the optical axis 32, which means the first reflective segment 310 is also disposed on the optical axis 32 by the actuator 400 in the first time period. Moreover, the first light beam is not incident the first incident surface 612 normally, such that the first light beam is incident the first gap 616 along the path 110 at an angle smaller than the total internal reflection angle of the interface of the first gap 616, but is incident the first gap 616 along the path 130 at an angle larger than the total internal reflection angle of the interface of the first gap 616 after the first light beam being reflected by the optical module 602 and the curved mirror 200 and propagating off of the optical axis 32. Therefore, the first light beam is reflected by the first gap 616 and reaches the multi-band filter 500. The another portion of the first light beam is then reflected by the multi-band filter 500, and the another portion is incident the first gap 616 at angle smaller then the total internal reflection angle of the interface of the first gap 616, such that the first light beam can pass through the first gap 616 again.

Similarly, reference is made back to FIG. 8. A second angle can be between the second light beam and a normal line of the second incident surface 642 of the fourth prism 640, i.e., the second light beam is not incident the second incident surface 642 normally, such that the position of the second light beam impinging to the rotational wheel 302 is off of the optical axis 32 of the stereoscopic display illuminator 30. Therefore, after passing through the rotational wheel 302 and being reflected by the curved mirror 200, the second light beam propagating along the path 110 can pass the outside of the rotational wheel 302 and be back to the optical module 602. Moreover, the second light beam is not incident the second incident surface 642 normally, such that the second light beam is incident the second gap 636 along the path 160 at an angle smaller than the total internal reflection angle of the interface of the second gap 636, but is incident the second gap 636 along the path 170 at an angle larger than the total internal reflection angle of the interface of the second gap 636 after the second light beam is reflected by the optical module 602 and the curved mirror 200 and propagates off of the optical axis 32. Therefore, the second light beam is reflected by the second gap 636.

Reference is made back to FIG. 10. Since in the first time period, the first light beam impinges to the first reflective segment 310 of the rotational wheel 302, and the second light beam impinges to the second transmission segment 340 of the rotational wheel 302 simultaneously, and in the second time period, the first light beam impinges to the first transmission segment 320 of the rotational wheel 302, and the second light beam impinges to the second reflective segment 330 of the rotational wheel 302 simultaneously, the first transmission segment 320 is disposed next to the second reflective segment 330 along a radial direction of the rotational wheel 302, and the first reflective segment 310 is disposed next to the second transmission segment 340 along the radial direction of the rotational wheel 302.

Reference is made to FIG. 8. In this embodiment, although the curved mirror 200 can reflect the first light beam and the second light beam from the rotational wheel 302 back to the rotational wheel 302 (see FIG. 9), the size of the curved mirror 200 has to be larger if the incident angles of the first light beam and the second light beam are large. Therefore, in other embodiments, the stereoscopic display illuminator 30 can further include a copy lens 800 disposed between the rotational wheel 302 and the curved mirror 200, and the copy lens 800 is used for converging the first light beam and the second light beam passing through the rotational wheel 302, such that the incident angles of the first light beam and the second light beam reaching the curved mirror 200 can be smaller, and the size of the curved mirror 200 can be reduced. Moreover, the curved mirror 200 can be a spherical mirror. However, the scope of the claimed invention should not be limited in this respect.

It should be understood that the number of the converging lenses 650 and 660 of the optical module 602 in FIG. 8 and FIG. 9 are only illustrative, and should not limit the scope of the present invention. The converging lenses 650 and 660 are used for converging light beams, such that the spot sizes of the first light beam and the second light beam impinging on the rotational wheel 300 can be reduced. Therefore, in other embodiments, the number of the converging lens can be one or more than two. A person having ordinary skill in the art can select the number of the converging lens of the optical module 602 according to actual requirements.

In one or more embodiments, the stereoscopic display illuminator 30 can be switched from the 3D display mode to the 2D display mode for convenience. Reference is made back to FIG. 8. When the stereoscopic display illuminator 30 of the present embodiment is switched to the 2D display mode, the first reflective segment 310 (see FIG. 10) of the rotational wheel 302 is fixed on the path of the first light beam by the actuator 400, the second transmission segment 340 of the rotational wheel 302 is fixed on the path of the second light beam by the actuator 400, and the multi-band filter 500 is dismounted. Therefore, the first light beam emitted from the first light source 100 propagates to the rotational wheel 302 along the path 110, and is reflected back to the optical module 602 by the rotational wheel 302. Along the path 120, the first light beam then passes through the adjacent position of the third prism 630 and the second prism 620, i.e., the position where the multi-band filter 500 is mounted in the 3D display mode, and reaches the light emission position 700. The second light beam emitted from the second light source 150 propagates to the rotational wheel 302 along the path 160, passes through the rotational wheel 302, and is reflected back to the optical module 602 by the curved mirror 200. Along the path 170, the second light beam then passes through the adjacent position of the third prism 630 and the second prism 620 and reaches the light emission position 700. Since the first light beam and the second light beam do not pass through the multi-band filter 500 in the 2D display mode, all wavelength ranges of the first light beam and the second light beam can reach the light emission position 700.

However, the structure of the stereoscopic display illuminator 30 in the 2D display mode is not limited by the structure mentioned above. Reference is made back to FIG. 9. In other embodiments, the first transmission segment 320 (see FIG. 10) of the rotational wheel 302 can be fixed on the path of the first light beam by the actuator 400, the second reflective segment 330 (see FIG. 10) of the rotational wheel 302 can be fixed on the path of the second light beam by the actuator 400, and a reflective mirror can be inserted into the adjacent position of the second prism 620 and the third prism 630, where the reflective mirror faces the second prism 620. The reflective mirror is disposed adjacent to one side of the multi-band filter 500. Therefore, the first light beam emitted from the first light source 100 propagates to the rotational wheel 302 along the path 110, passes through the first transmission segment 320, reaches the curved mirror 200, and is reflected back to the optical module 602 by the curved mirror 200. Along the path 130, the first light beam is then reflected to the reflective mirror by the second prism 620, and is reflected to the light emission position 700 by the reflective mirror. In addition, the second light beam emitted from the second light source 150 propagates to the rotational wheel 302 along the path 160, is reflected to the reflective mirror along the path 180 by the rotational wheel 302, and is reflected to the light emission position 700 by the reflective mirror. In this embodiment, all wavelength ranges of the first light beam and the second light beam can reach the light emission position 700 by the reflection of the reflective mirror.

In one or more embodiments, the stereoscopic illuminator 30 can further include the color wheel 710 and the color wheel actuator 720 (both see FIG. 6) for splitting the left- and the right-eye light beams into a plurality of primary-color left- and right-eye light beams. Moreover, the stereoscopic display illuminator 30 of the present embodiment and the light modulating mechanism 900 of FIG. 7 can be combined to be a stereoscopic display device. Since other relevant light splitting and modulating details are all the same as the embodiment shown in FIG. 7, and, therefore, these are not repeated hereinafter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A stereoscopic display illuminator, comprising:
   a first light source for providing a first light beam;
   a curved mirror;
   a rotational wheel disposed between the first light source and the curved mirror, and comprising a first transmission segment and a first reflective segment;
   an actuator for rotating the rotational wheel, such that the first transmission segment and the first reflective segment of the rotational wheel are disposed on a path of the first light beam in sequence;
   a multi-band filter for allowing portion of the first light beam to pass through, and allowing another portion of the first light beam to be reflected, wherein the wavelengths of these two portions do not overlap; and
   an optical module disposed between the first light source and the rotational wheel for guiding the first light beam to the rotational wheel, and guiding the first light beam to propagate either from the first reflective segment or from the curved mirror to two opposite sides of the multi-band filter, such that the portion of the first light beam passes through the multi-band filter and reach a light emission position, and the another portion of the first light beam is reflected by the multi-band filter and reaches the light emission position.

2. The stereoscopic display illuminator of claim 1, wherein the stereoscopic display illuminator has an optical axis, and a position the first light beam impinging to the rotational wheel is off of the optical axis.

3. The stereoscopic display illuminator of claim 1, wherein the optical module comprises:
   a first prism having a first incident surface and an emission surface, wherein the first light source is disposed adjacent to the first incident surface, and the light emission position is disposed adjacent to the emission surface;
   a second prism defining a first gap with the first prism;
   a third prism, wherein the multi-band filter is disposed between the second prism and the third prism; and
   at least one converging lens disposed between the second prism and the rotational wheel.

4. The stereoscopic display illuminator of claim 3, wherein an angle is between the first light beam and a normal line of the first incident surface of the first prism.

5. The stereoscopic display illuminator of claim 1, wherein the optical module comprises:
   a first prism having a first incident surface and an emission surface, wherein the first light source is disposed adjacent to the first incident surface, and the light emission position is disposed adjacent to the emission surface;
   a second prism defining a first gap with the first prism;
   a reflective mirror, wherein the multi-band filter is disposed between the second prism and the reflective mirror; and
   at least one converging lens disposed between the second prism and the rotational wheel.

6. The stereoscopic display illuminator of claim 5, wherein an angle is between the first light beam and a normal line of the first incident surface of the first prism.

7. The stereoscopic display illuminator of claim 1, wherein the first reflective segment of the rotational wheel is disposed on the path of the first light beam by the actuator in a first time period, and the first transmission segment of the rotational wheel is disposed on the path of the first light beam by the actuator in a second time period.

8. The stereoscopic display illuminator of claim 7, wherein in the first time period, the first light beam incident on the optical module is guided to the first reflective segment of the rotational wheel, reflected to the optical module by the first reflective segment, and then guided to the multi-band filter by the optical module, such that the portion of the first light beam is guided to the light emission position by the optical module after passing through the multi-band filter.

9. The stereoscopic display illuminator of claim 7, wherein in the second time period, the first light beam passes through the first transmission segment of the rotational wheel and reaches the curved mirror.

10. The stereoscopic display illuminator of claim 7, wherein in the second time period, the first light beam incident on the optical module is guided to the first transmission segment of the rotational wheel, passing through the first transmission segment, reaching the curved mirror, reflected to the optical module by the curved mirror, and then guided to the multi-band filter by the optical module, such that the another portion of the first light beam is reflected by the multi-band filter, and is guided to the light emission position by the optical module.

11. The stereoscopic display illuminator of claim 1, further comprising a second light source for providing a second light beam;
   wherein the rotational wheel further comprises a second transmission segment and a second reflective segment;
   wherein the actuator further for rotating the rotational wheel, such that the second transmission segment and the second reflective segment of the rotational wheel are disposed on a path of the second light beam in sequence;
   wherein the multi-band filter further allowing a portion of the second light beam to pass through, and allowing another portion of the second light beam to be reflected, wherein the wavelengths of these two portions do not overlap; and
   wherein the optical module is further disposed between the second light source and the rotational wheel for further guiding the second light beam to the rotational wheel, and respectively guiding the second light beam propagating from the second reflective segment and the second light beam propagating from the curved mirror to the two opposite sides of the multi-band filter, such that the portion of the second light beam passes through the multi-band filter and reaches the light emission position, and the another portion of the second light beam is reflected by the multi-band filter and reaches the light emission position.

12. The stereoscopic display illuminator of claim 11, wherein the stereoscopic display illuminator has an optical axis, and a position the first light beam impinging to the rotational wheel is off of the optical axis to one side, and a position the second light beam impinging to the rotational wheel is off of the optical axis to the a side opposite to the side.

13. The stereoscopic display illuminator of claim 11, wherein the optical module comprises:
   a first prism having a first incident surface and an emission surface, wherein the first light source is disposed adjacent to the first incident surface, and the light emission position is disposed adjacent to the emission surface;
   a second prism defining a first gap with the first prism;
   a third prism, wherein the multi-band filter is disposed between the second prism and the third prism;
   a fourth prism defining a second gap with the third prism, wherein the fourth prism has a second incident surface, and the second light source is disposed adjacent to the second incident surface; and
   at least one converging lens disposed between the second prism and the rotational wheel.

14. The stereoscopic display illuminator of claim 13, wherein a first angle is between the first light beam and a normal line of the first incident surface, and a second angle is between the second light beam and a normal line of the second incident surface.

15. The stereoscopic display illuminator of claim 11, wherein the first transmission segment is disposed next to the second reflective segment along a radial direction of the rotational wheel, and the first reflective segment is disposed next to the second transmission segment along the radial direction of the rotational wheel.

16. The stereoscopic display illuminator of claim 11, wherein the stereoscopic display illuminator has an optical axis, and the first transmission segment and the first reflective segment are disposed on the optical axis in sequence.

17. The stereoscopic display illuminator of claim 11, wherein the first reflective segment of the rotational wheel is disposed on the path of the first light beam by the actuator in a first time period, the second transmission segment of the rotational wheel is disposed on the path of the second light beam by the actuator in the first time period, the first transmission segment of the rotational wheel is disposed on the path of the first light beam by the actuator in a second time period, and the second reflective segment of the rotational wheel is disposed on the path of the second light beam by the actuator in the second time period.

18. The stereoscopic display illuminator of claim 17, wherein in the first time period, the second light beam passes through the second transmission segment of the rotational wheel and reaches the curved mirror; and in the second time period, the first light beam passes through the first transmission segment of the rotational wheel and reaches the curved mirror.

19. The stereoscopic display illuminator of claim 17, wherein in the first time period, the first light beam incident on the optical module is guided to the first reflective segment of the rotational wheel, reflected to the optical module by the first reflective segment, and then guided to the multi-band filter by the optical module, such that the portion of the first light beam is guided to the light emission position by the optical module after passing through the multi-band filter; and wherein in the first time period, the second light beam incident on the optical module is guided to the second transmission segment of the rotational wheel, passing through the second transmission segment, reaching the curved mirror, reflected to the optical module by the curved mirror, and then guided to the multi-band filter by the optical module, such that the portion of the second light beam is guided to the light emission position after passing through the multi-band filter.

20. The stereoscopic display illuminator of claim 17, wherein in the second time period, the first light beam incident on the optical module is guided to the first transmission segment of the rotational wheel, passing through the first transmission segment, reaching the curved mirror, reflected to the optical module by the curved mirror, and then guided to the multi-band filter by the optical module, such that the another portion of the first light beam is reflected by the multi-band filter, and is guided to the light emission position by the optical module; and wherein in the second time period, the second light beam incident on the optical module is guided to the second reflective segment of the rotational wheel, reflected to the optical module by the second reflective segment, and guided to the multi-band filter by the optical module, such that the another portion of the second light beam is reflected by the multi-band filter, and is guided to the light emission position by the optical module.

21. The stereoscopic display illuminator of claim 1, further comprising a copy lens disposed between the rotational wheel and the curved mirror.

22. The stereoscopic display illuminator of claim 1, wherein the curved mirror is a spherical mirror.

23. The stereoscopic display illuminator of claim 1, further comprising a color wheel disposed at the light emission position, wherein the color wheel is for filtering a portion of light beams reaching the light emission position.

24. A stereoscopic display device comprising:
the stereoscopic display illuminator of claim 1; and
a light modulating mechanism comprising:
    at least one dichroic mirror disposed at the light emission position, wherein the dichroic mirror is for splitting the portion of the first light beam and the another portion of the first light beam to a plurality of primary-color light beams;
    a plurality of liquid crystal panels for forming the primary-color light beams to a plurality of image light beams; and
    a light combining prism for collecting the image light beams and projecting to a lens.

\* \* \* \* \*